(12) United States Patent
Fein et al.

(10) Patent No.: US 8,943,038 B2
(45) Date of Patent: Jan. 27, 2015

(54) METHOD AND APPARATUS FOR INTEGRATED CROSS PLATFORM MULTIMEDIA BROADBAND SEARCH AND SELECTION USER INTERFACE COMMUNICATION

(75) Inventors: Gene S. Fein, Lenox, MA (US); Edward Merritt, Lenox, MA (US)

(73) Assignee: Gefemer Research Acquisitions, LLC, Wilmington, DE (US)

( * ) Notice: Subject to any disclaimer, the term of this patent is extended or adjusted under 35 U.S.C. 154(b) by 1389 days.

(21) Appl. No.: 11/867,423

(22) Filed: Oct. 4, 2007

(65) Prior Publication Data
US 2009/0094197 A1 Apr. 9, 2009

(51) Int. Cl.
*G06F 17/30* (2006.01)

(52) U.S. Cl.
CPC .................................. *G06F 17/3005* (2013.01)
USPC .......................................................... 707/707

(58) Field of Classification Search
CPC .................................................. G06F 17/3005
USPC ...................................... 707/3–5, 104.1, 707
See application file for complete search history.

(56) References Cited

U.S. PATENT DOCUMENTS

| | | | |
|---|---|---|---|
| 5,933,827 A * | 8/1999 | Cole et al. ............................... | 1/1 |
| 5,963,956 A | 10/1999 | Smartt | |
| 5,987,457 A * | 11/1999 | Ballard ................................. | 1/1 |
| 6,055,540 A * | 4/2000 | Snow et al. ............................ | 1/1 |
| 6,084,595 A | 7/2000 | Bach et al. | |
| 6,094,657 A * | 7/2000 | Hailpern et al. ............... | 707/740 |
| 6,148,289 A * | 11/2000 | Virdy ................................. | 705/8 |
| 6,385,602 B1 * | 5/2002 | Tso et al. .............................. | 1/1 |
| 6,434,520 B1 | 8/2002 | Kanevsky et al. | |
| 6,675,162 B1 * | 1/2004 | Russell-Falla et al. ................ | 1/1 |
| 6,691,105 B1 * | 2/2004 | Virdy .................................... | 1/1 |
| 6,763,496 B1 * | 7/2004 | Hennings et al. ............. | 715/205 |
| 6,925,474 B2 | 8/2005 | McGrath et al. | |
| 7,013,289 B2 * | 3/2006 | Horn et al. ................. | 705/14.51 |
| 7,085,845 B2 | 8/2006 | Woodward et al. | |

(Continued)

FOREIGN PATENT DOCUMENTS

| | | |
|---|---|---|
| WO | WO 99/22318 | 5/1999 |
| WO | 2004023243 | 3/2004 |

OTHER PUBLICATIONS

"Copernic Desktop Search—Screenshots" Internet Citation, [Online] Jan. 4, 2007, p. 1, XP002478355 retrieved from the Internet: URL:http://web.archive.org/web/20070104184054/http://www.copernic.com/en/products/desktop-search/screenshots.html>[retrieved on Apr. 25, 2008] the whole document.

(Continued)

*Primary Examiner* — Sheree Brown

(57) ABSTRACT

Disclosed is a method and system for an integrated cross platform multimedia broadband search and selection user interface. The user interface searches for media across different platforms including the user's stored media and all other media available both online and offline. The interface uses a series of icons to display search results. The method includes (i) receiving a query having at least one search term from a user, (ii) performing a search in a network of databases being executed by the user utilizing the at least one search term, (iii) assigning each search result among the search results to at least one icon, and (iv) displaying the at least one icon with the respective search result.

30 Claims, 9 Drawing Sheets

(56) References Cited

U.S. PATENT DOCUMENTS

| | | | |
|---|---|---|---|
| 7,219,108 | B2 | 5/2007 | Kothuri et al. |
| 7,272,593 | B1 | 9/2007 | Castelli et al. |
| 7,299,222 | B1* | 11/2007 | Hogan et al. .............. 707/3 |
| 7,305,397 | B2* | 12/2007 | Spencer, Jr. .............. 1/1 |
| 8,082,242 | B1* | 12/2011 | Mysen et al. ............. 707/711 |
| 2002/0087599 | A1* | 7/2002 | Grant et al. .............. 707/513 |
| 2003/0146939 | A1 | 8/2003 | Petropoulos |
| 2003/0229590 | A1* | 12/2003 | Byrne et al. .............. 705/40 |
| 2004/0044672 | A1* | 3/2004 | Spencer, Jr. ............. 707/100 |
| 2004/0148229 | A1* | 7/2004 | Maxwell ................. 705/26 |
| 2005/0086197 | A1* | 4/2005 | Boubez et al. ............ 707/1 |
| 2005/0273405 | A1* | 12/2005 | Chen .................... 705/35 |
| 2006/0190437 | A1 | 8/2006 | Popper |
| 2007/0005436 | A1* | 1/2007 | Baum et al. .............. 705/26 |
| 2007/0112758 | A1* | 5/2007 | Livaditis ................ 707/5 |
| 2008/0172374 | A1* | 7/2008 | Wolosin et al. ........... 707/5 |
| 2009/0005123 | A1* | 1/2009 | Lessing ................. 455/566 |

OTHER PUBLICATIONS

"Oiaga, Marius, Softpedia—Microsoft Codename "Casino"" Internet Citation, [Online] http://news.softpedia.com/news/Microsoft-Codename-Casino-42293.shtml, Dec. 13, 2006.

"Rooney, Paula ChannelWeb—Microsoft 'Casino'" Internet Citation, [Online] Search Interface Built as Google Desktop Killer, URL: http://crn.com/software/197008146;jsessionid=AVODNDZ1X0HUFQE1GHPCKHWATMY32JVN, Feb. 22, 2007.

"Play a Song and Get Related News, Concert Info, Biographies, Top 20 charts, Discographies, Unreleased Tracks, New Release Info" WINAMP, Digital Music Netowrk, http://www.winamp.com/plugin/digital-music-network/87108, Apr. 19, 2010.

U.S. Appl. No. 60/289,768, filed May 9, 2001.

U.S. Appl. No. 60/289,772, filed May 9, 2001.

* cited by examiner

LIVE EVENTS

VIDEO ON DEMAND

SHOPPING

DIGITAL VIDEO RECORDER

METHOD AND APPARATUS FOR INTEGRATED CROSS PLATFORM MULTIMEDIA BROADBAND SEARCH AND SELECTION USER INTERFACE COMMUNICATION

BACKGROUND INFORMATION

It is well known that searching online for data can yield video, text, audio and image results. It is also established that searching mechanisms online or locally cached searching mechanisms can search a user's own computer for documents, emails and media stored on the user's computer. Currently, search mechanisms for multimedia such as Microsoft's Media Center®, Google.com®, Youtube.com®, Mac operating systems such as OSX®, iTunes.com®, PC operating systems such as Windows®, email services and programs and TIVO® all integrate search mechanisms to locate specific data. Each system is able to locate data whether it be email, music, video, audio, documents or images.

Unfortunately, the existing conventional uses have certain limitations in use, distribution and deployment. Most search mechanisms above compartmentalize the search process to specific kinds of data within the realm contemplated by the search engine. For instance, iTunes.com® locates all media stored or available within the iTunes® system, which is a small subset of all available video, images and audio online. iTunes® also only searches for data stored on its own format and program, not through the user's locally, or remotely stored available data. Email programs only search emails sent and received. The Media Center® only searches media identified by the Media Center System® to the user's local computer and peripherals. Operating systems typically only allow a user to search what is stored locally on the user's computer except for separated searches, not cohesive to the searches for what is stored on the user's computer using installed search engines such as Google®. Search engines such as Google® search across different media formats such as text, images and video but do not organize the data in a way that integrates other devices to the data in a useful manner, such as how the Media Center® functions. Google® also fails to present the data from different media searches, for example, images and text, in tandem. Google® searches for different media forms and are conducted via separate menu selections for separate media forms. This process is multi-stepped and results in the organization of different media materials of the same subject not being in a single cohesive list, which necessitates the user merging lists of search results and performing multiple searches to access integrated multimedia data. Once accessed and formed into cohesive lists, the user still has no simple way to access certain forms of media, store them, pay for them and network other devices to the stored media to play, display, alter or share the media.

Accordingly, there is a need for an integrated search system for media that creates an environment where media may be searched for across platforms of the user's stored media and all other media available both online and offline. The need for a system that searches across all media forms and then presents the options to organize search results, access media, purchase and store, synch, attend, reserve, interconnect, share, and transfer all within a cohesive interface would simplify the cumbersome processes that now exist to integrate the search and results for varied media forms online.

SUMMARY OF THE DISCLOSURE

An embodiment of the disclosure relates to the creation of an interface and database search mechanism that locates multimedia sources across vast online and offline data pools, organizes the information in the most efficient way according to the user, presents the information to the user, gives the user options or automatically acquires the media and then deploys the media across a wide range of devices according to the user's desires and the specific restrictions relating to the media, its rights and the device's ability to play and present the media effectively. The system uses a series of media icons to display search results. For instance, if a user searched for "Blades of Glory" using the system, then the user results could be prefaced by a series of icons that correlate directly to the media type contained in the search answer responses. For example, if there is a live event based upon the film, then an icon for live events displays next to the search response with perhaps, some text and a link to that event or tour information. If the film is available on VOD via the user's cable system, then that icon and listing is displayed. If the film is still in theaters, then the listing icon for live films is displayed. Web sites based upon the film, blogs and reviews all get a web icon. If the user has already downloaded the film "Blades of Glory" and it resides in iTunes.com®, Movielink.com®, or on the users hard drive, then a local cache computer icon appears in the search. The same computer icon could be utilized perhaps with the addition of a document icon if the user wrote a paper on "Blades of Glory" and the paper resided on the user's own computer within a document.

The user may pre-set, or select after the result is displayed on his computer or portable device, which device selected content appears for audio and or visual use or storage by the user. The range of devices can include a remote website, FTP site or password protected site, burned fixed media, or any networked device compatible with the system and media desired by the user.

What happens when a user selects the search item returned by the system is a consistent experience for the user, in that the system follows a simple set of rules. If there is no default set by the user then a search item automatically downloads to the computer's hard drive. If the user has set a destination for the content, such as a Digital Video Recorder (DVR), iPhone® or iPod® Video for audiovisual content, which can be based upon media type, whether it is a wireless or wired device, the system then takes the next step automatically to deliver the content to the selected device. If the device is not properly configured, if the content requires rights clearance or there is another compatibility issue, then the system sends out an error message to the user alerting the user to the issue.

The system may also take logical steps for the user. For instance, if a user selects a search result for a film playing nearby, the system may skip the link opening page and move directly to the 'purchase tickets' page of the site, saving the user time in the process. Additionally, where users are required to pay for rights to content such as iTunes®, Movielink®, etc., the sites can be ghosted into a single cohesive interface for the system where users only interact with a single billing system, then that billing system establishes accounts for the user with the subsystem (i.e., iTunes®, Movielink®) and creates a discrete billing and user relationship with the service that the user never sees, unless the user elects to do business with the site specific branded environment instead. All usability and library functions associated with the user's rights to the content and integration into prior collections may be identical. TV shows or webisodes can be selected from online listing aggregated by the system and recorded to a device based upon user needs. Multiple documents, site links, video clips and images can be stored in a single folder as part of a research or hobby project.

In an example embodiment is a method and system for an integrated cross platform multimedia search and selection interface. The example embodiment includes (1) receiving a query having at least one search term from a user, (2) performing a search in a network of databases being executed by the user utilizing the at least one search term, (3) assigning each search result among the search results to at least one icon, and (4) displaying the at least one icon with the respective search result. The system or interface may be used for interconnecting or communicating between two or more components connected to an interconnection medium (e.g., a bus) within a single computer or digital data processing system.

BRIEF DESCRIPTION OF THE DRAWINGS

The foregoing will be apparent from the following more particular description of example embodiments, as illustrated in the accompanying drawings in which like reference characters refer to the same parts throughout the different views. The drawings are not necessarily to scale, emphasis instead being placed upon illustrating principles of example embodiments.

DETAILED DESCRIPTION OF EMBODIMENTS

A description of example embodiments follows.

At least one embodiment relates to the creation of a system that combines data searches by title, name, media type or genre generating a spate of results in the UI revealing relevant films, music, web sites, images, streams, live events or video on demand (VOD) offerings. Each media source type is coded with an icon or menu listing that allows the user to see not only what is available on the search, but also in what form the results will be presented in and when and where the media will be available, for what price. For example, streamed or downloadable media, digital images, cable program, DVR, VOD, website/html, e-mail, document, application, live events etc., can all be listed in a single search query result.

Figure 1:
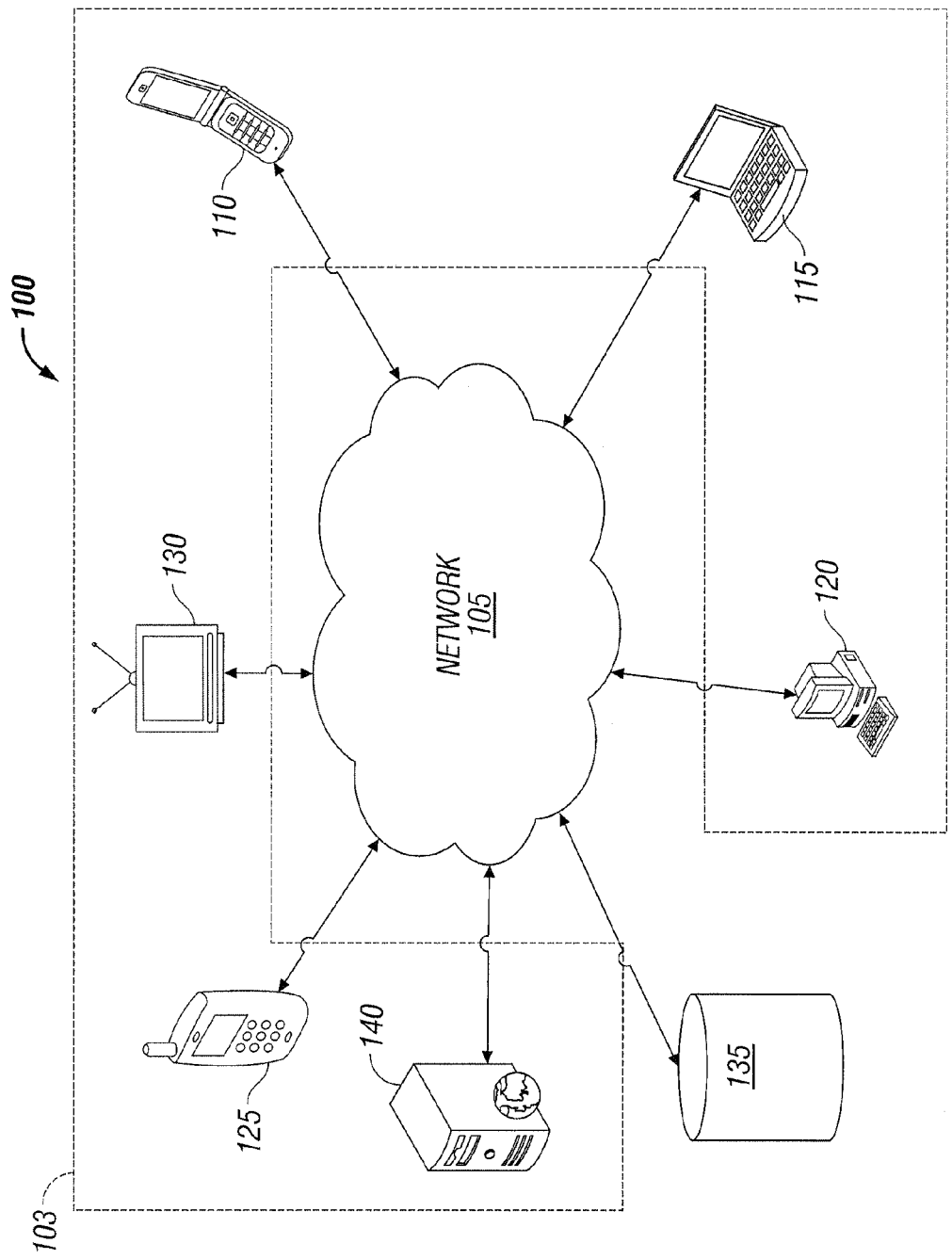
FIG. 1 is a network diagram representing an integrated cross platform multimedia broadband search and selection interface in accordance with an example embodiment.

FIG. 1 illustrates a network diagram 100 representing an integrated cross platform multimedia broad search and selection interface according to one example embodiment. As indicated in this figure, the network 100 can comprise of one or more computing devices 103 that are each connected to a network 105. As suggested by FIG. 1, the computing devices 103 can each comprise personal computers (PCs) such as desktop computers 120 or laptops 115. The computing devices may also be a cellular telephone 110, personal data assistant (PDA) 125, television 130, and various other devices, both stationary and mobile. The computing devices 103 are in some way connected to the network 105 (directly or wirelessly) and are capable of communicating via the network 105. Therefore, the computing devices 103 can comprise substantially any device capable of connecting to the network 105 and transmitting data across and/or receiving data from the network including network-enabled PDAs 125 and mobile telephones 110.

The network 105 can comprise one or more networks that are communicatively coupled. The networks can include, for example, an Ethernet, a local area network (LAN), a wide area network (WAN), the Internet, radio communication, telephone or other wire, cable an/or optical fiber, optical communication, or any other network and/or communication means. In an example embodiment, the network 105 is a set of networks that make up part of the Internet. Further included in the system 100 shown in FIG. 1 is at least one database 135 and one or more web site host servers 140. Where, as indicated above, the network 105 comprises the Internet, each of the servers 140 comprises a web server capable of generating and uploading web sites and/or web pages to the Internet and, more particularly, the World Wide Web. As indicated in the figure, each of the servers 140 and database 135 is connected to the network 105, typically through a direct, physical connection.

Figure 2:
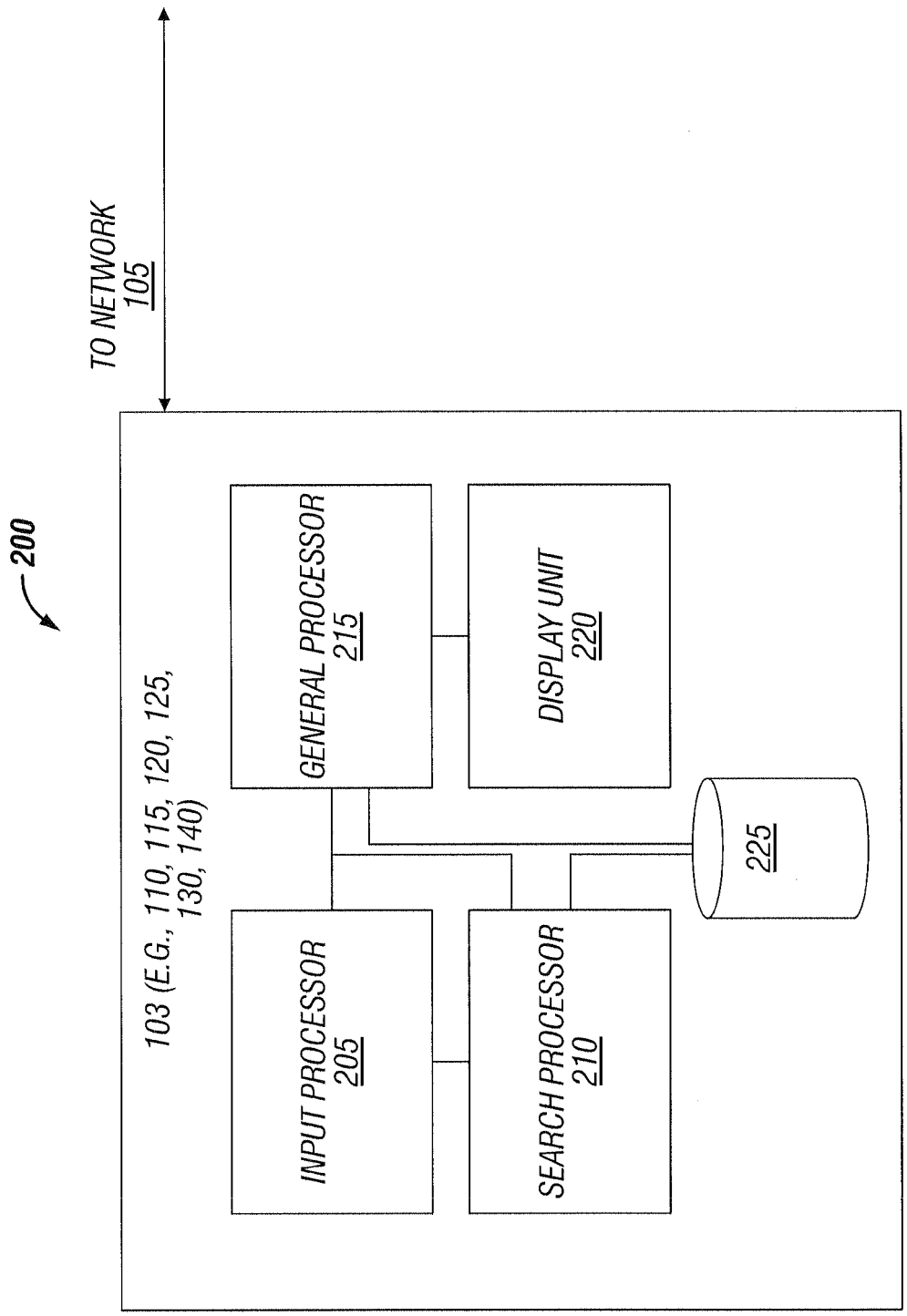
FIG. 2 is a schematic diagram representing an integrated cross platform multimedia broadband search and selection interface in accordance with an example embodiment.

FIG. 2 illustrates an integrated cross platform multimedia broadband search and selection interface 200 according to one example embodiment. The interface 200 may be part of the computing devices 103 (e.g., 110, 115, 120, 125, 130, 140) or the interface 200 may be a separate stand-alone device. The interface 200 includes an input processor 205, a search processor 210, a general processor 215, a display unit 220, and a local storage device 225. The input processor 205 receives a user entered search term. Searches are performed based on the entered information. These searches are conducted by the search processor 210, which examines records that match the entered information (i.e., element), such that at least the record element field starts with the specific element information that was entered. Upon entering as much information as is available to the user, the user may launch the search by clicking on a search button (not shown). A Reset button (not shown) may exist to clear the text from the search box (not shown). To help the user with the entry of information via display unit 220, a number of error messages relating to the searches may be provided. For example, if at least one character is not entered into the search box (FIG. 4, reference number 405) an error message is displayed in an error pop-up window.

It should be understood that the search term may be alphanumeric, text, video, audio, or any combination thereof. Additionally, the search term may be an image. As is known in the art, a digital image is an image that may be represented as an array of pixels with each of the pixels represented by a digital word. Often the array is provided as a two-dimensional array of pixels. As is known in the art, a content based image retrieval system is an image retrieval system that classifies, detects, and retrieves images from databases (e.g., 135, 225) by utilizing directly the content of the image. Content based image processing systems refer to systems which process information in an image by classifying or otherwise identifying subject matter within the image. In one embodiment, the interface 200 is capable of using content based image/video retrieval systems and utilize images or video frames which have been supplemented with text corresponding to explanatory notes or key words associated with the images. For more details regarding the content based image retrieval system, reference can be made to U.S. Pat. No. 6,084,595 issued Jul. 4, 2000, entitled "Indexing Method for Search Engine", which is hereby incorporated by reference in its entirety. The user retrieves desired images from a database 135 and/or a local storage device 225. Feature vectors are extracted from visual data in the images. Primitives, such as color, texture, and shape constitute parameters that can be distilled from the images. A feature vector is based on at least one such primitive. The feature vectors associated with the images are stored in the database (e.g., 135, 225).

In another alternative image and search retrieval system, the interface 200 is capable of retrieving images based on a specified shape. For example, if the user copies or pastes an image of a fish in a search box (e.g., FIG. 5, reference number 505), the interface 200 may search based on the shape of the fish. The interface 200 may also utilize image statistics including color and texture. The interface 200 may utilize an image processor having an image analyzer as described in the World Intellectual Property Organization International Publication Number WO 99/22318, entitled "Image Search and Retrieval System", which is hereby incorporated by reference in its entirety. Feature modules define particular regions of an image and measurements to make on pixels within the defined region as well as any neighboring regions. The feature modules thus specify parameters and characteristics that are important in a particular image match/search routine. As a result, a relatively rapid comparison of images is made possible.

In yet another alternative image and search retrieval system for video is described in more details in U.S. Pat. No. 6,925,474 issued Aug. 2, 2005, entitled "Video Information Retrieval", which is hereby incorporated by reference in its entirety.

In yet another alternative image and search retrieval system uses an image search algorithm tool based upon degree matches of line formations, shapes, and proportional image composition and colors. An iterative refinement algorithm for content-based retrieval of images based on low-level features is described in more details in U.S. Pat. No. 7,272,593 issued Sep. 18, 2007, entitled "Method and Apparatus for Similarity Retrieval From Iterative Refinement", which is hereby incorporated by reference in its entirety.

Databases may be used to organize information according to a number of techniques. Database types include, but are not limited to, Quadtrees, B-trees, and R-trees. Each of these database types is more suitable for storing and organizing a particular type of data. Generally, R-trees are used to store multi-dimensional data. These R-trees store spatial objects formed by aggregating minimum bounding contours. Each node in an R-tree represents a region in space. A child node of a node in an R-tree represents a sub-region of the region in space represented by the node. Once an R-tree is created it is typically desired to access and utilize the data stored in the R-tree. One way that the data in an R-tree is utilized involves determining the relative positions of particular objects, such as finding certain types of businesses in a zip code. The analysis of objects in spatial and/or geographic databases, such as R-trees, to determine relationships, such as overlapping regions and point-by-point continuity, is performed using sophisticated mathematical algorithms. Typically, these mathematical algorithms implement a post-processing function to a candidate query result set to generate a final result set. The post-processing function includes loading each object in the candidate query result set and performing an exact point-by-point comparison of each object in the final result set with a query object. The loading of each object in the candidates query result set and comparing each object in the candidate query result set to the query object uses a substantial amount of memory and computing power, takes an unacceptable period of time, and costs a substantial amount of money. These database types are further described in detail in U.S. Pat. No. 5,963,956 issued Oct. 5, 1999, entitled "System and Method of Optimizing Database Queries in Two or More Dimensions" and U.S. Pat. No. 7,219,108 issued May 15, 2007, entitled "Query Prunning Using Exterior Tiles in an R-Tree Index", both of which are hereby incorporated by reference in its entirety.

If the search term is an audio clip, the interface 200 is capable of searching and retrieving search results that may include audio clips. A user can then retrieve desired segments of the audio file from the databases using waveform technology as described in more detail in U.S. Pat. No. 6,434,520 issued Aug. 13, 2002, entitled "System and Method for Indexing and Querying Audio Archives", which is hereby incorporated by reference in its entirety.

Utilizing any of the search/retrieve systems as described above, the interface 200 is capable of retrieving images based upon, for example, color, shape and form mapping, as well as being able to extrapolate the size of an image to an input image of a different size. For example, a picture of the Statue of Liberty compared to the actual Statue of Liberty, or a one inch picture of the Statue of Liberty compared to a 30' poster of the Statue of Liberty available for sale via Ebay® or some other sites or databases (e.g., 135, 225). The search processor 210 searches the database 135 and the local storage 225 for all related matches being executed by the user. For example, if the user searches for the movie "Gone with the Wind", the search processor 210 may search and retrieve results from various databases and various menu listings or media types. The various media types or menu listings may include print, streamed media, music, video, audio, still digital images, video digital images, e-mail, website/HTML, text-based documents, or any combination thereof. The various databases may include querying databases that are locally connected to the user (e.g., local storage 225), databases that are remotely connected to the user (e.g., database 135), and databases via the Internet. The search result may also include different media types from the same database (e.g., 135, 225). For example, the local storage 225 may include a document and a theme song for "Gone with the Wind."

The general processor 215 may download the search results, wherein the downloaded search results are machine readable and comprise one or more of text data, image data, alphanumeric data, video data, and audio data. The general processor 215 may assign each search result among the search results to at least one icon. The results could be prefaced by a series of icons that correlates directly to the media type contained in the search answer responses. For example, if there is a live event based upon the film, then an icon for live events displays next to the search response with perhaps, some text and a link to that event or tour information. If the film is available on video on demand (VOD) via the user's cable system then that icon and listing is displayed. If the film is still in theaters then that listing icon of live films is displayed. Web sites based upon the film, blogs and reviews all get a web icon. If the user has already downloaded the film "Gone with the Wind" and it resides in iTunes.com®, Movielink.com® or on the users hard drive (e.g., 225) then a local cache computer icon appears in the search. The same computer icon could be utilized perhaps with the addition of a document icon if the user wrote a paper on "Gone with the Wind" and the paper resided on the user's own computer (e.g., 225) within a document.

The general processor 215 may also assign each of the icons to a subject matter. The subject matter being title, name, media type, or any other genre, and associate each of the search results with the subject matter. For example, the search for "Gone with the Wind" may include an icon for still digital images and that icon may include a list of images by name. In another example, the result may have a movie icon, and the subject matter may be a list of theaters that are showing the movie. It should be understood that there are numerous ways of categorizing the search result into a variety of subject matters than the ones discussed above. The goal here is to have the list organized in such a manner that is user friendly. The display unit 220 may display the icon with for the respective search result. The display unit may also display the icon with the respective subject matter having the search result.

Figure 3:
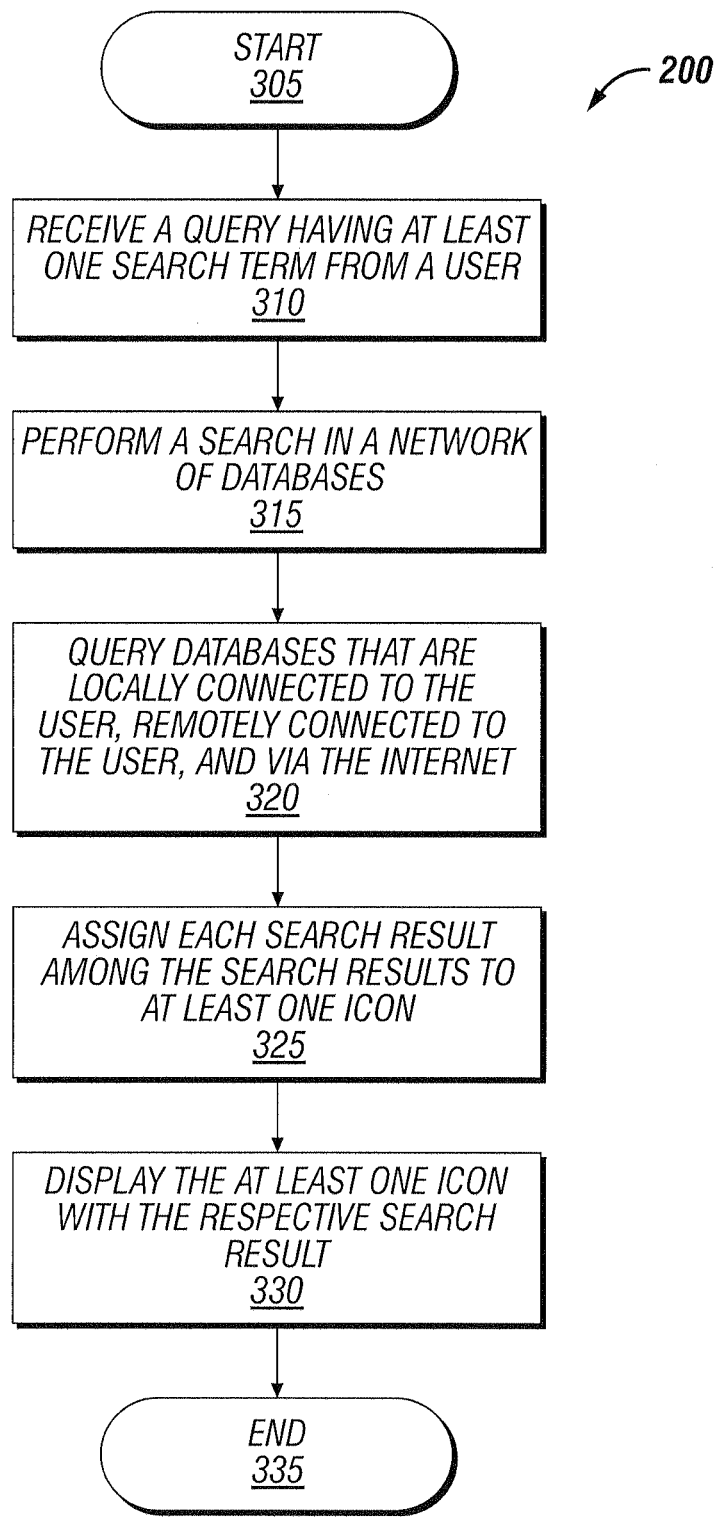
FIG. 3 is a flowchart of steps performed by the interface in accordance with an example embodiment.
Figure 4A:
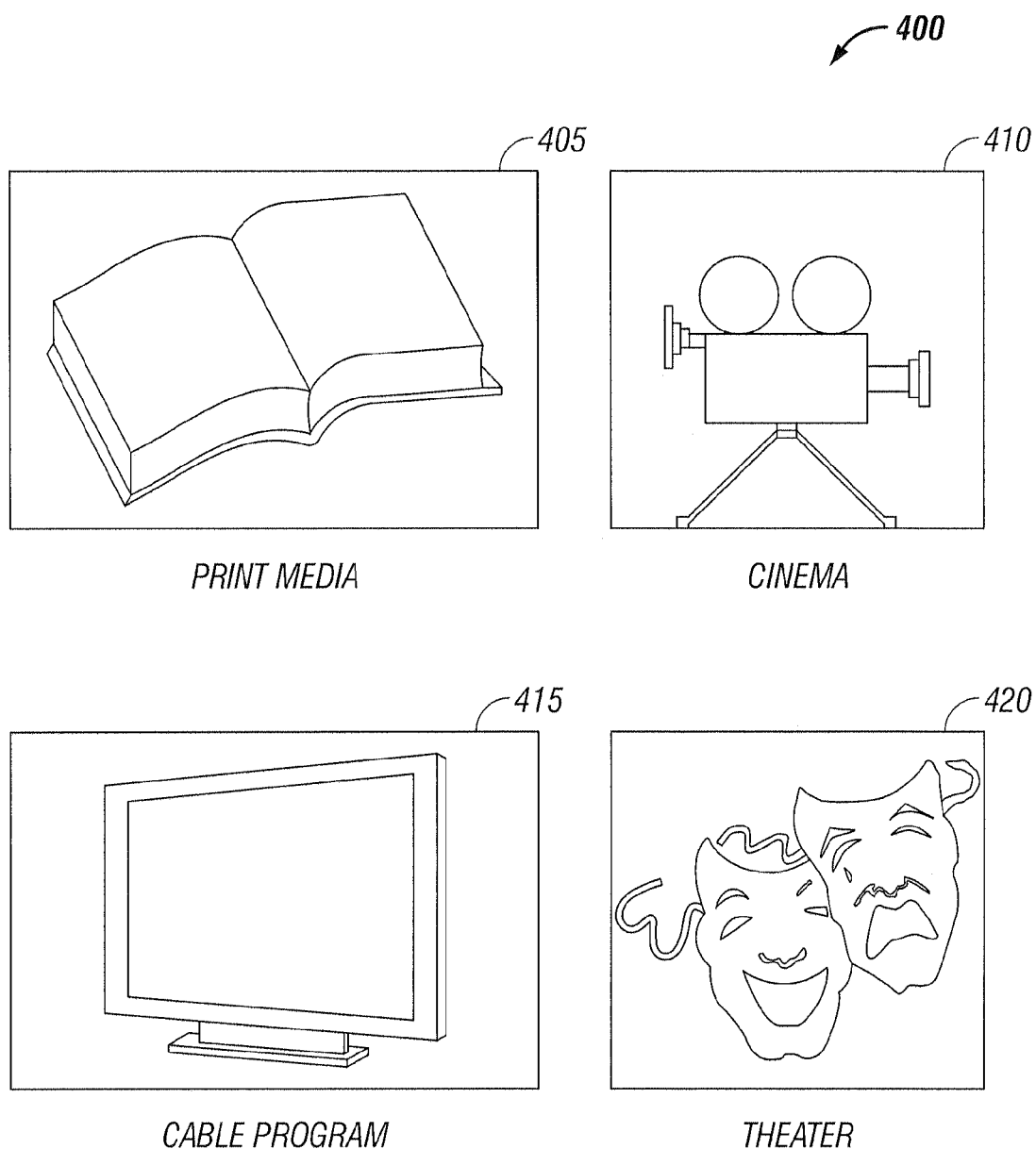
FIGS. 4A-4E are icons in accordance with an example embodiment.
Figure 4B:
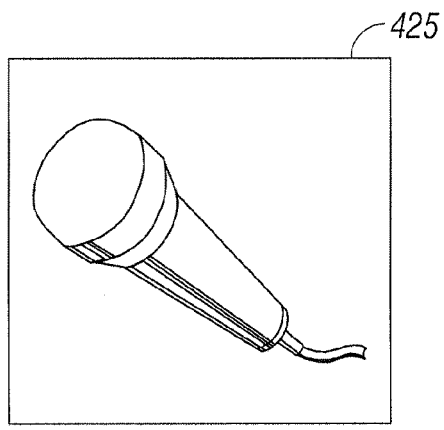
Figure 4B:
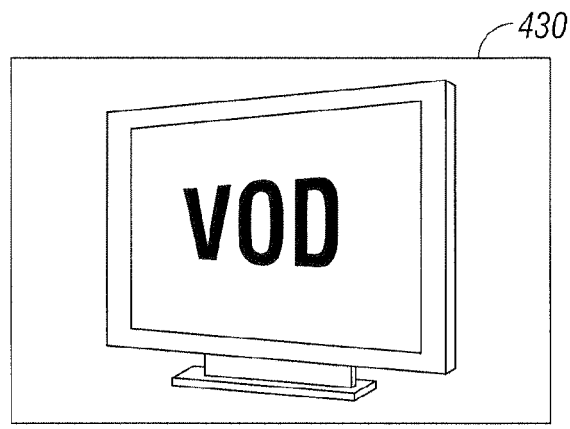
Figure 4B:
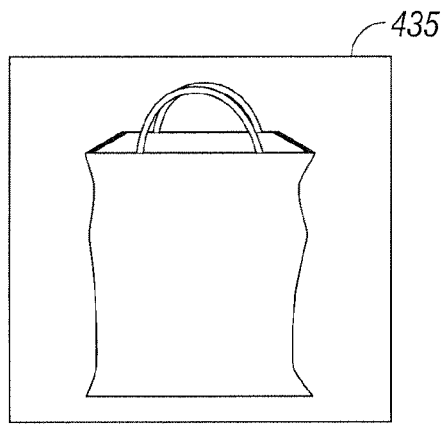
Figure 4B:
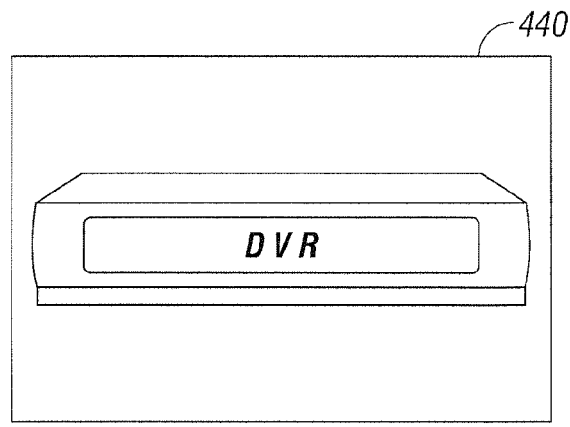
Figure 4C:
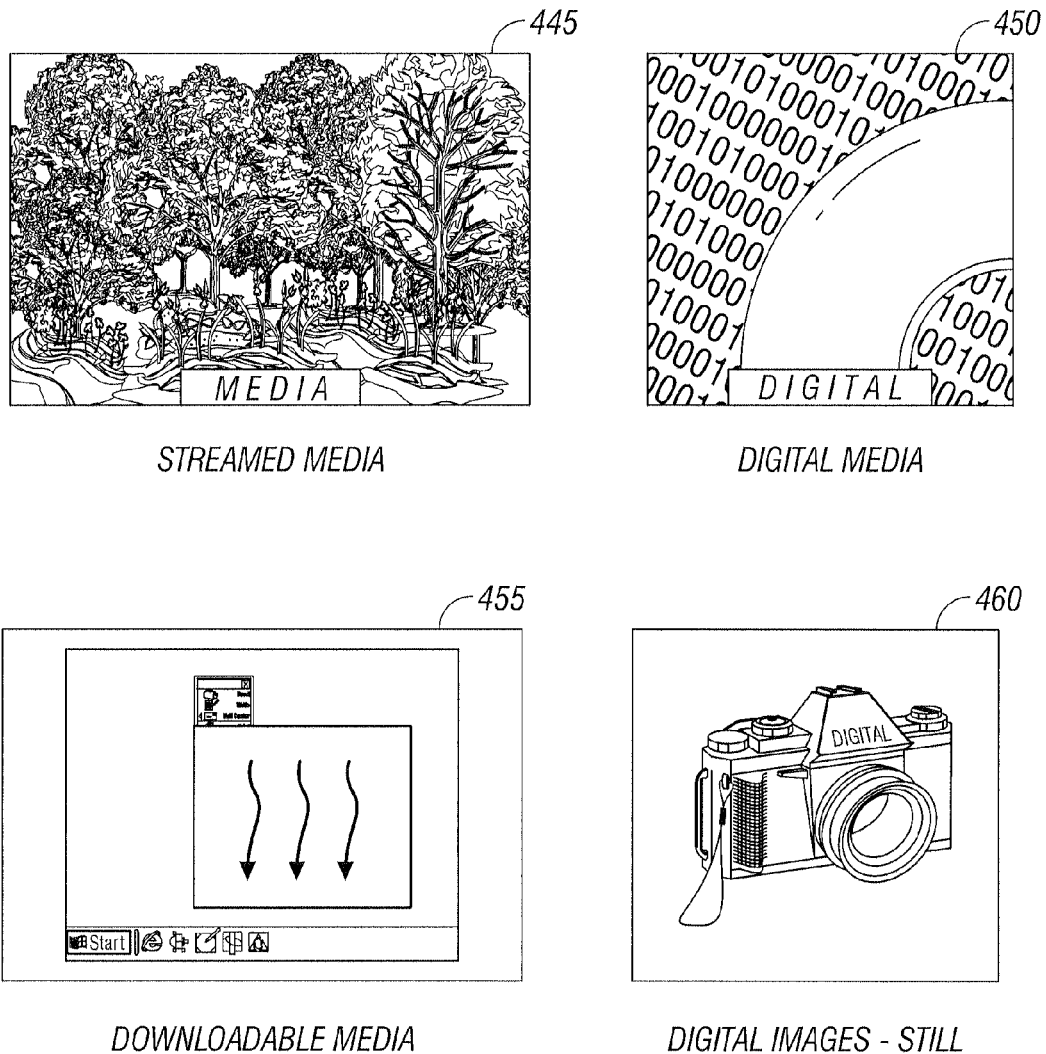
Figure 4D:
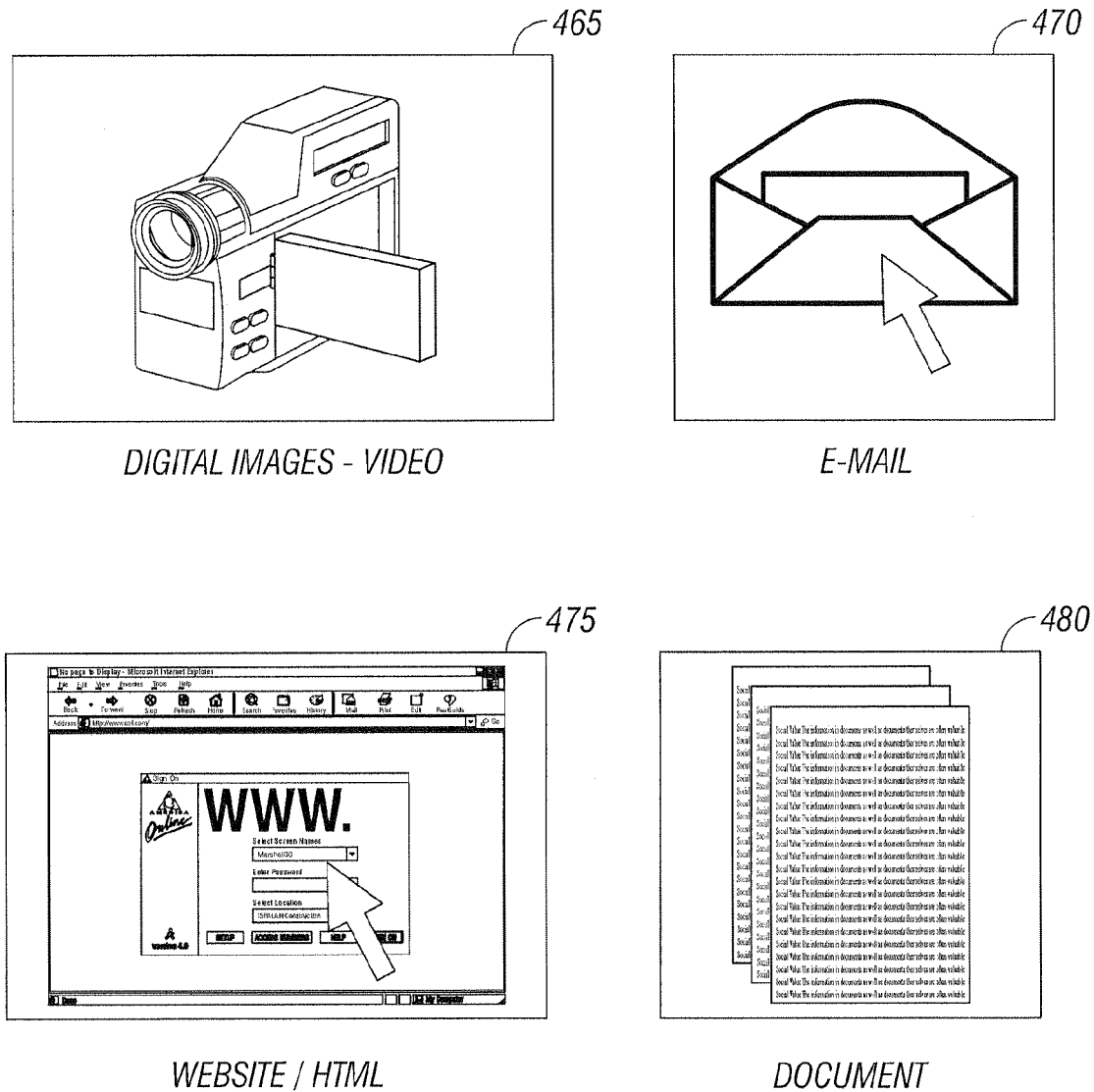
Figure 4E:
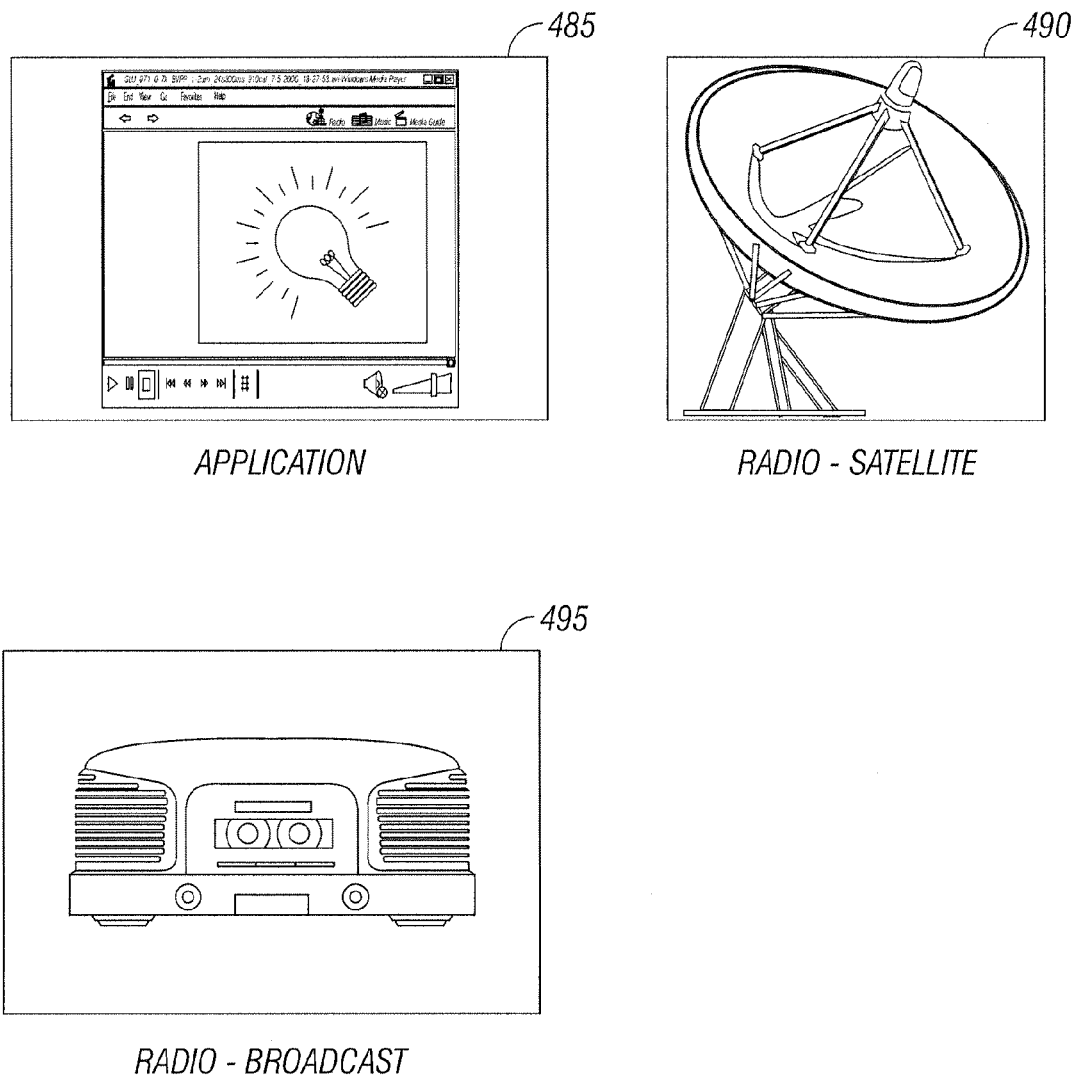

FIG. 3 is a flowchart that illustrates the method for performing a search and selection by the interface 200 in accordance with an example embodiment. In operation, an embodiment of the interface 200 starts (305) and receives a query from a user. The query includes at least one search term. The interface then performs a search in a network of databases (e.g., 135, 225) being executed by the user utilizing the at least one search term (315). The search may include search results from different media types. The various media types include print, streamed media, music, video, audio, still digital images, video digital images, e-mail, website/HTML, text-based documents, or any combination thereof. The search may also include querying databases that are locally connected to the user, remotely connected to the user, and via the Internet (320).

The interface may then assign each search result among the search results to at least one icon (325). The icon may be a print media icon, cable program icon, cinema icon, theater icon, live events icon, video on demand (VOD) icon, shopping icon, digital video recorder (DVR) icon, streamed media icon, digital media icon, downloadable media icon, still digital images icon, video digital images icon, e-mail icon, website/HTML icon, document icon, application icon, radio-satellite icon, radio-broadcast icon, or any combination thereof. The interface 200 may assign each of the at least one icon to at least one subject matter, with the at least one subject matter being title, name, media type, or any other genre. The interface may further associate each of the search results with the at least one subject matter.

A display unit 220 of the interface 200 may display the at least one icon with the respective search result (330) before ending in step 335. The display unit 220 may also display the at least one icon with the respective at least one subject matter having the search result.

FIGS. 4A-4E are icons 400 in accordance with an example embodiment. The icons 400 may include print media 405, cinema 410, cable program 415, theater 420, live events 425, Video On Demand (VOD) 430, shopping 435, Digital Video Recorder (DVR) 440, streamed media 445, digital media 450, downloadable media 455, digital images-still 460, digital images-video 465, e-mail 470, website/HTML 475, document 480, application 485, radio satellite 490, and radio-broadcast 495. It should be understood that any of the above icons 400 are examples and there may be more icons.

Figure 5:
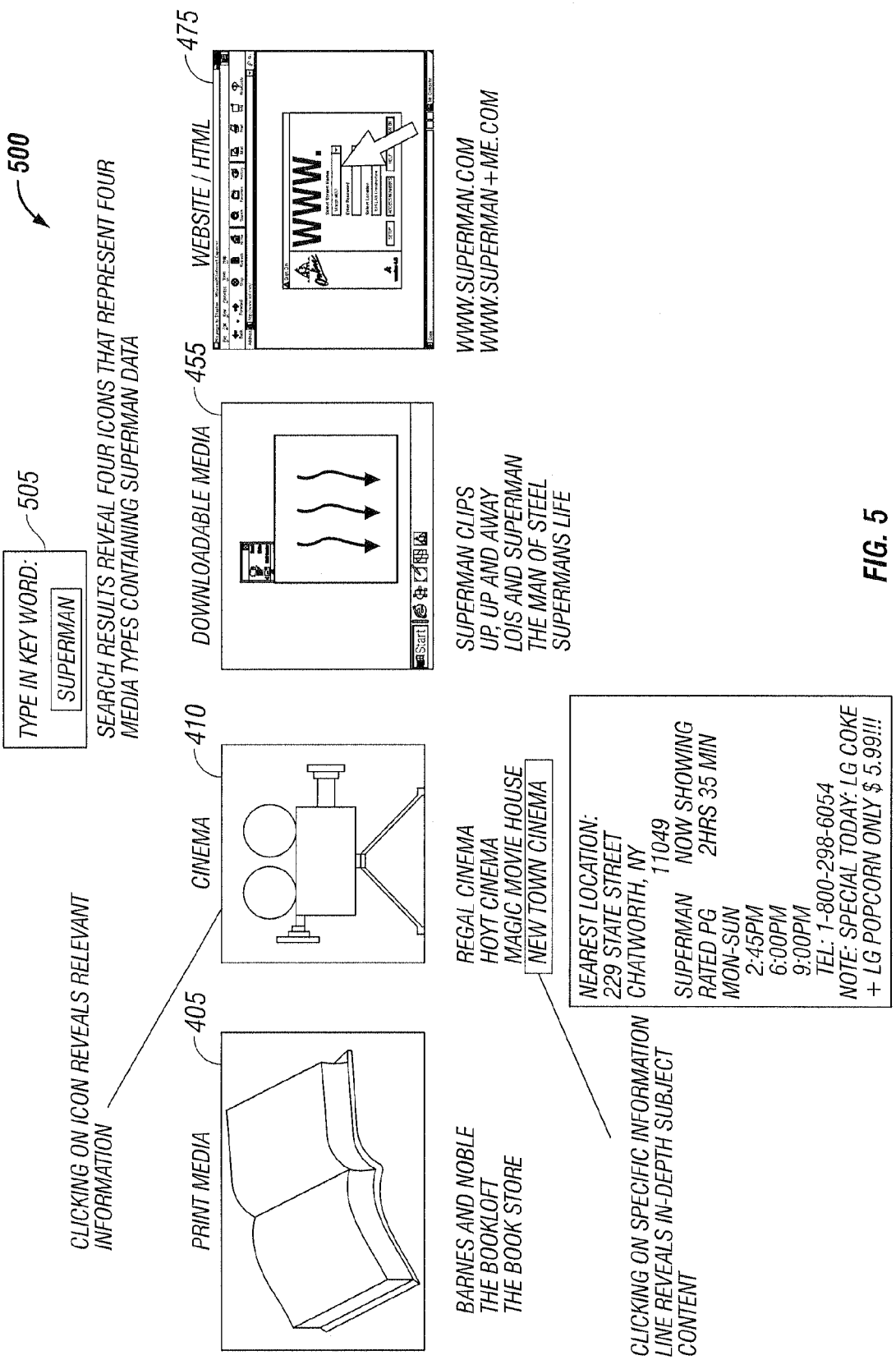
FIG. 5 is a view of the search result on a display screen in accordance with an example embodiment.

FIG. 5 is a view of the search result on a display screen 500 of the display unit 220 in accordance with an example embodiment. The screen 500 includes a search box 505 for the user to type in the search term. The search box 505 may receive the search term in a variety of forms, such as alphanumeric character, text, image, video, audio, or any combination thereof. If the search term is in an audio format, the search box 505 may include a load feature to load the audio clip. However, in this example, the user may type the search term in textual form to be "Superman". The search result listed four icons by media type: print media 405, cinema 410, downloadable media 455, and website/HTML 475. When the user clicks on one of the icons (e.g., 405, 410, 455, 475), a list of more relevant information is revealed for each of the respective icons. The list may be organized by subject matter.

For example, the subject matter for the media icon may include a number of bookstores. Similarly, for the cinema icon 410, there may be a list of movie theaters near the user. By clicking on one of the theaters, more information is revealed, such as the location and the time of "Superman" being played.

It should be understood that any of the above-described flow diagrams of FIG. 3 or underlying methods used to implement aspects related to the networks of FIG. 2 may be implemented in the form of hardware, firmware, software or any combination thereof. If implemented in software, the software may be in any suitable form that can be stored on any form of machine-readable medium (e.g., CD-ROM, floppy disk, tape, random access memory (RAM), read-only memory (ROM), optical disk, magnetic disk, FLASH memory, system memory, and hard drive), and loaded and executed by at least one general purpose or application specific processor. The software may be downloaded to nodes in a network via any form of network link including wired, wireless, or optical links, and via any form of communications protocol.

It should be further understood that the flow diagram of in FIG. 3 is merely an example embodiment, and other configurations, arrangements, additional blocks, fewer blocks, and so forth are possible in other embodiments. For example, the techniques illustrated in these figures may be performed sequentially, in parallel, or in an order other than that which is described. In addition, it should be appreciated that not all of the techniques described are required to be performed, that additional techniques may be added, and that some of the illustrated techniques may be substituted with other techniques.

What is claimed is:

1. A method comprising:
   receiving a query having at least one search term;
   obtaining at least one search result by utilizing the at least one search term to perform a cross-platform search of at least one database;
   making a first determination that an obtained search result has been selected, resulting in a selected search result;
   in response to making the first determination, making a second determination that the selected search result and content associated with the selected search result requires payment; and
   in response to making the second determination, presenting a single billing interface configured to allow a user to interact with the single billing interface without directly interacting with a billing interface of a website associated with the selected search result.

2. The method of claim 1, further comprising:
   assigning each obtained search result to at least one icon, wherein the at least one icon is related to the obtained search result; and
   displaying the at least one icon next to the obtained search result.

3. The method of claim 1 wherein the at least one search result is one of print, streamed media, music, video, audio, still digital images, video digital images, e-mail, website/HTML, text-based documents, or any combination thereof.

4. The method of claim 1 wherein the at least one database comprises a locally connected database.

5. The method of claim 1 wherein the at least one database comprises a remotely connected database.

6. The method of claim 1 wherein the at least one database comprises a database that is connected via the Internet.

7. The method of claim 1 wherein the at least one database comprises a database having different media types.

8. The method of claim 1 wherein the at least one icon is one of a print media icon, cable program icon, cinema icon, theater icon, live events icon, VOD icon, shopping icon, DVR icon, streamed media icon, digital media icon, downloadable media icon, still digital images icon, video digital images icon, e-mail icon, website/HTML icon, document icon, application icon, radio-satellite icon, radio-broadcast icon, or any combination thereof.

9. The method of claim 1 further comprising:
assigning each of the at least one icon to at least one subject matter, wherein the at least one icon is related to the at least one subject matter;
associating each obtained search result with the at least one subject matter; and
displaying the at least one icon with the at least one subject matter having the obtained search result.

10. The method of claim 9 wherein the at least one subject matter is at least one of a title, name, and media type.

11. The method of claim 1 further comprising:
downloading the obtained search result, wherein the downloaded search result is machine readable and comprises one or more of text data, image data, video data, and audio data.

12. The method of claim 1, wherein the content associated with the selected search result is a movie listing.

13. The method of claim 1, further comprising:
subsequent to presenting the single billing interface, receiving billing information; and
in response to receiving the billing information, conveying the billing information to a service associated with the selected search result.

14. The method of claim 13, further comprising:
establishing an account for future purchases on the website associated with the selected search result using the single billing interface.

15. A system comprising:
means for receiving a query comprising at least one search term;
means for obtaining at least one search result by utilizing the at least one search term to search a plurality of databases, wherein the at least one search term is multimedia content selected from the group consisting of a video file, an audio file, and an image file;
means for making a first determination that an obtained search result has been selected;
means for making a second determination that the selected search result requires payment; and
means for presenting a single billing interface configured to allow a user to interact with the single billing interface without directly interacting with a billing interface of a website associated with the selected search result.

16. A system comprising:
an input processor configured to receive a query comprising at least one search term;
at least one database;
one or more processors configured to:
obtain at least one search result by utilizing the at least one search term to perform a cross-platform search of the at least one database;
make a first determination that an obtained search result has been selected;
in response to making the first determination, make a second determination that the selected search result requires payment; and
in response to making the second determination, present a single billing interface configured to allow a user to interact with the single billing interface without directly interacting with a billing interface of a website associated with the selected search result.

17. The system of claim 16 wherein the at least one database is a locally connected database.

18. The system of claim 16 wherein the at least one database is a remotely connected database.

19. The system of claim 16 wherein the at least one database is connected via the Internet.

20. The system of claim 16 wherein the at least one database comprises a database having different media types.

21. The system of claim 16, wherein the one or more processors is further configured to assign each obtained search result to at least one icon, wherein the at least one icon is related to the obtained search result, and the system further comprises a display unit configured to display the at least one icon next to the obtained search result.

22. The system of claim 16, wherein the one or more processors is further configured to establish an account for future purchase on the website associated with the selected search result using the single billing interface.

23. The system of claim 21 wherein the at least one icon comprises a print media icon, cable program icon, cinema icon, theater icon, live events icon, VOD icon, shopping icon, DVR icon, streamed media icon, digital media icon, downloadable media icon, still digital images icon, video digital images icon, e-mail icon, website/HTML icon, document icon, application icon, radio-satellite icon, radio-broadcast icon, or any combination thereof.

24. The system of claim 21 wherein the one or more processors is further configured to:
assign the at least one icon to at least one subject matter, wherein the at least one icon is related to the at least one subject matter; and
associate the obtained search result with the at least one subject matter.

25. The system of claim 24 wherein the display unit is further configured to:
display the at least one icon with the at least one subject matter having the obtained search result.

26. The system of claim 16 wherein the one or more processors is further configured to:
download the obtained search result, wherein the downloaded search result is machine readable and comprises one or more of text data, image data, video data, and audio data.

27. The system of claim 21 wherein the at least one icon is at least one menu listing.

28. The system of claim 27 wherein the at least one menu listing comprises a media type, wherein the media type is one of print, streamed media, music, video, audio, still digital images, video digital images, e-mail, website/HTML, text-based documents, or any combination thereof.

29. The system of claim 16 wherein each obtained search result comprises a different media type from the at least one database.

30. The system of claim 24 wherein the at least one subject matter is at least one of a title, name, and media type.

* * * * *